US008879288B2

(12) United States Patent
Fujita

(10) Patent No.: US 8,879,288 B2
(45) Date of Patent: Nov. 4, 2014

(54) AC/DC CONVERTER DEVICE

(75) Inventor: Takayuki Fujita, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 161 days.

(21) Appl. No.: 13/634,775

(22) PCT Filed: Mar. 17, 2011

(86) PCT No.: PCT/JP2011/056377

§ 371 (c)(1),
(2), (4) Date: Sep. 13, 2012

(87) PCT Pub. No.: WO2011/125448

PCT Pub. Date: Oct. 13, 2011

(65) Prior Publication Data

US 2013/0016538 A1 Jan. 17, 2013

(30) Foreign Application Priority Data

Apr. 7, 2010 (JP) .................................. 2010-088855

(51) Int. Cl.
*H02M 5/42* (2006.01)
*H02M 5/458* (2006.01)
*H02M 7/219* (2006.01)

(52) U.S. Cl.
CPC ............ *H02M 5/4585* (2013.01); *H02M 7/219* (2013.01)
USPC .......................................................... 363/84

(58) Field of Classification Search
USPC ................... 363/34, 37, 84, 97, 98, 131, 132
See application file for complete search history.

(56) References Cited

U.S. PATENT DOCUMENTS

| 5,250,890 | A | * | 10/1993 | Tanamachi et al. | ............ 318/811 |
| 2009/0175059 | A1 | * | 7/2009 | Sakakibara | ..................... 363/36 |
| 2010/0213769 | A1 | | 8/2010 | Sakakibara | |
| 2010/0244570 | A1 | | 9/2010 | Sakakibara | |
| 2012/0063178 | A1 | * | 3/2012 | Fujita et al. | ..................... 363/37 |

FOREIGN PATENT DOCUMENTS

| JP | 62-233070 A | 10/1987 |
| JP | 4135026 B2 | 8/2008 |
| JP | 4135027 B2 | 8/2008 |
| JP | 2053731 A1 | 4/2009 |
| JP | 2009-106111 A | 5/2009 |
| JP | 4270316 B2 | 5/2009 |
| JP | 4301336 B2 | 7/2009 |

OTHER PUBLICATIONS

Extended European Search Report for corresponding Application No. 11765350.1 dated Sep. 25, 2013.

\* cited by examiner

*Primary Examiner* — Adolf Berhane
*Assistant Examiner* — Yemane Mehari
(74) *Attorney, Agent, or Firm* — Birch, Stewart, Kolasch & Birch, LLP

(57) ABSTRACT

A command value is a current command value with a triangular-like waveform having a cycle that is ⅓ of a cycle of a three-phase voltage. A carrier has a triangular-like waveform having a cycle shorter than the cycle of the command value. Comparison result signals are pulse signals indicating a result of the comparison between the carrier and the command value. In a region of a phase of 30 to 90 degrees, a portion of the comparison result signal present in this region is employed as a gate signal. In a region of a phase of 270 to 330 degrees, a portion of the comparison result signal present in this region is employed as the gate signal.

4 Claims, 9 Drawing Sheets

F I G. 2
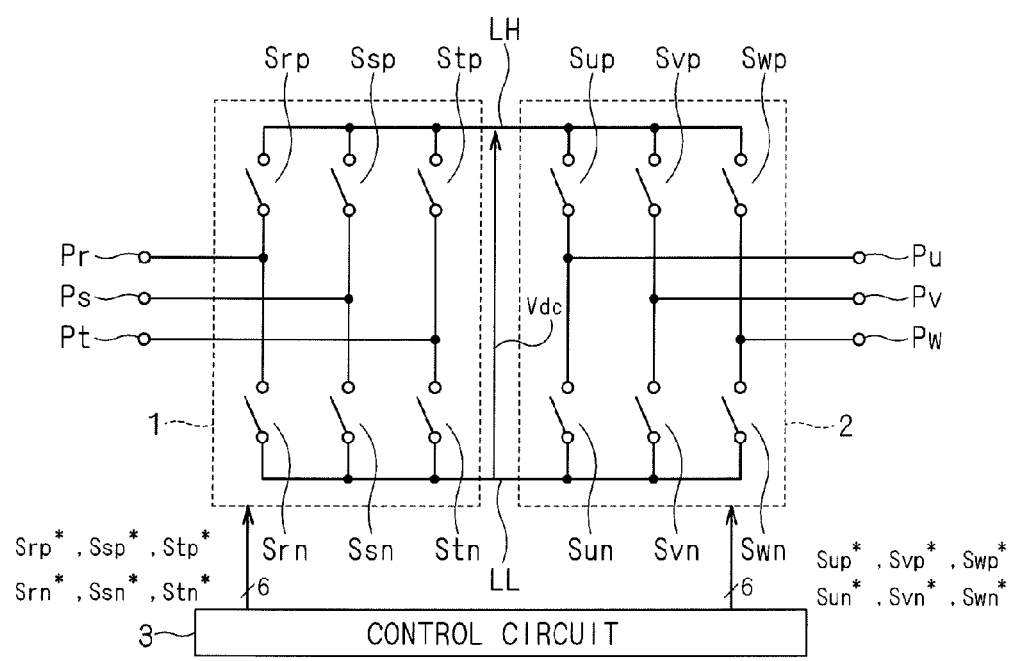

F I G. 3
(a)  (b)
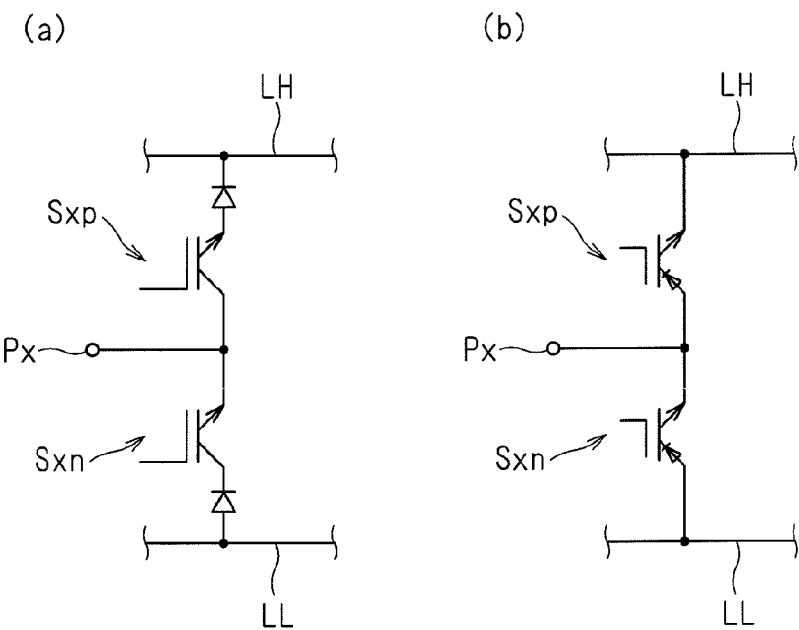
F I G. 4
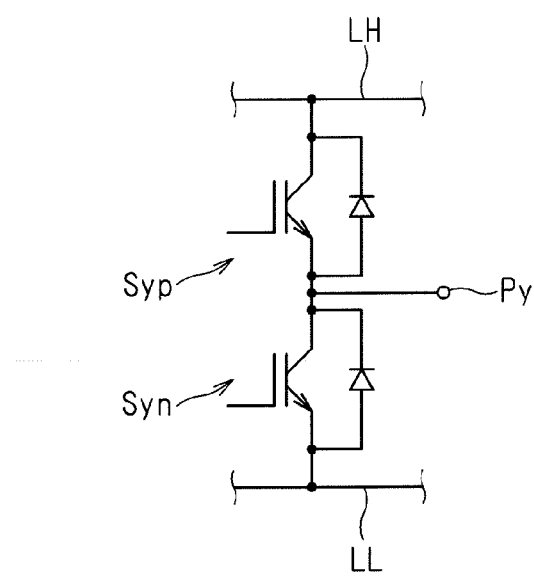

US 8,879,288 B2

AC/DC CONVERTER DEVICE

TECHNICAL FIELD

The present invention relates to an AC/DC converter device that converts multiphase alternate current into direct current. The AC/DC converter device constitutes a direct power converter device having no power storage means at a DC link portion in combination with a DC/AC converter device, for example.

BACKGROUND ART

There has been known a structure formed by combining a current source converter and a voltage converter, as a direct power converter device. Here, as the current source converter, for example, not a converter whose commutation depends only upon an input voltage, such as a mere diode bridge, but an active converter whose conduction/non-conduction is controlled by an external control is employed. Such a configuration described above is described in Japanese Patent Nos. 4135026, 4135027, 4270316 and 4301336. It is to be noted that Lixiang Wei, Thomas. A Lipo, "A Novel Matrix Converter Topology With Simple Commutation", IEEE IAS 2001, vol. 3, pp 1749-1754. 2001 describes a technique of controlling a conduction ratio of a line current in a trapezoidal waveform.

SUMMARY OF INVENTION

Problems to be Solved by the Invention

In Japanese Patent No. 4135026, when a three-phase current source converter is controlled, three voltage command signals having trapezoidal-like waveforms are temporarily generated. A result obtained by comparing these voltage command signals to a carrier for modulating a pulse width is logically converted for a control of the current source converter. Accordingly, for the control of the current source converter, the comparison of three phases and six types of logical conversions in total are needed for the control of three phases and a switching control for upper and lower arms of the converter.

In Japanese Patent No. 4135027, when a three-phase current source converter is controlled, twelve voltage command signals having trapezoidal-like waveforms are generated. These signals and two types of carriers are compared, and six types of logical ORs are obtained, thereby obtaining six signals for the switching control.

As described above, many comparisons between the command value and the carrier are executed in the conventional technique. In view of this, the present invention provides a technique of controlling a current source converter by reducing a comparison between a command value and a carrier.

Means for Solving the Problems

An AC/DC converter device according to the present invention includes first to third input terminals (Pr, Ps, Pt), first and second DC power source lines (LH, LL), a current source active converter having first to sixth switching elements (Srp, Ssp, Stp, Sm, Ssn, Stn), and a control circuit (3).

First to third phase voltages (Vr, Vs, Vt) for forming a three-phase voltage are respectively inputted to the first to third input terminals (Pr, Ps, Pt).

The active converter outputs a rectified voltage (Vdc), having a potential higher at the first DC power source line than at the second DC power source line, between the first and second DC power source lines.

The first to third switching elements (Srp, Ssp, Stp) are connected between each of the first to third input terminals and the first DC power source line.

The fourth to sixth switching elements (Sm, Ssn, Stn) are connected between each of the first to third input terminals and the second DC power source line.

The control circuit (3) generates first to sixth control signals (Srp*, Ssp*, Stp*, Srn*, Ssn*, Stn*) that control the conduction/non-conduction of the first to sixth switching elements.

The first to third switches apply current only in a direction toward the first DC power source line from themselves. The fourth to sixth switches apply current only in a direction from the second DC power source line toward themselves.

According to a first aspect of the AC/DC converter device according to the present invention, the control circuit includes a command signal generating portion (11), a comparing portion (12), and a comparison result signal allocating portion (14; 13, 16, 17).

The command signal generating portion (11) generates a current command value (I*) with a triangular-like waveform having a cycle that is ⅓ of the cycle of the three-phase voltage from a synchronization signal (Vp) synchronized with the three-phase voltage.

The comparing portion (12) outputs a result, which is obtained by comparing a carrier (C1) with a triangular-like waveform having a cycle shorter than the cycle of the current command value and the current command value, as complementary first and second comparison result signals (Ka, Kb).

The comparison result signal allocating portion (14) inputs the first and second comparison result signals so as to generate the first to sixth control signals.

The comparison result signal allocating portion outputs, as the first control signal (Srp*), the second comparison result signal (Kbrp) in a region corresponding to the phase of 60 degrees having the point where the phase of the three-phase voltage progresses by 30 degrees from the point where the first phase voltage (Vr) takes the maximum value as a starting point, and the first comparison result signal (Karp) in a region corresponding to the phase of 60 degrees having the point where the phase progresses by 90 degrees from the point where the first phase voltage takes the minimum value as a starting point.

The comparison result signal allocating portion also outputs, as the fourth control signal (Srn*), the first comparison result signal (Karn) in a region corresponding to the phase of 60 degrees having the point where the phase progresses by 30 degrees from the point where the first phase voltage takes the minimum value as a starting point, and the second comparison result signal (Kbrn) in a region corresponding to the phase of 60 degrees having the point where the phase progresses by 90 degrees from the point where the first phase voltage takes the maximum value as a starting point.

Further, the comparison result signal allocating portion also outputs, as the second control signal (Ssp*), the second comparison result signal (Kbsp) in a region corresponding to the phase of 60 degrees having the point where the phase progresses by 30 degrees from the point where the second phase voltage (Vs) takes the maximum value as a starting point, and the first comparison result signal (Kasp) in a region corresponding to the phase of 60 degrees having the point where the phase progresses by 90 degrees from the point where the second phase voltage takes the minimum value as a starting point.

The comparison result signal allocating portion also outputs, as the fifth control signal (Ssn*), the first comparison result signal (Kasn) in a region corresponding to the phase of 60 degrees having the point where the phase progresses by 30 degrees from the point where the second phase voltage takes the minimum value as a starting point, and the second comparison result signal (Kbsn) in a region corresponding to the phase of 60 degrees having the point where the phase progresses by 90 degrees from the point where the second phase voltage takes the maximum value as a starting point.

In addition, the comparison result signal allocating portion also outputs, as the third control signal (Stp*), the second comparison result signal (Kbtp) in a region corresponding to the phase of 60 degrees having the point where the phase progresses by 30 degrees from the point where the third phase voltage (Vt) takes the maximum value as a starting point, and the first comparison result signal (Katp) in a region corresponding to the phase of 60 degrees having the point where the phase progresses by 90 degrees from the point where the third phase voltage takes the minimum value as a starting point.

The comparison result signal allocating portion also outputs, as the sixth control signal (Stn*), the first comparison result signal (Katn) in a region corresponding to the phase of 60 degrees having the point where the phase progresses by 30 degrees from the point where the third phase voltage takes the minimum value as a starting point, and the second comparison result signal (Kbtn) in a region corresponding to the phase of 60 degrees having the point where the phase progresses by 90 degrees from the point where the third phase voltage takes the maximum value as a starting point.

According to a second aspect of the AC/DC converter device according to the present invention, in the first aspect, the comparison result signal allocating portions (14; 13, 16, 17) includes a rising/falling signal generating portion (17), a peak range signal generating portion (16), and an logical product/logical sum operating portion (13).

The rising/falling signal generating portion (17) generates, from the synchronization signal (Vp), first to third rising signals (Cra, Csa, Cta) that are activated during a period in which the first to third phase voltages rise respectively, and first to third falling signals (Crb, Csb, Ctb) that are activated during a period in which the first to third phase voltages falls respectively.

The peak range signal generating portion (16) generates first to sixth peak range signals from the synchronization signal.

The logical product/logical sum operating portion (13) performs logical product operation and logical sum operation by using the first to sixth peak range signals, the first to third rising signals, the first to third falling signals, and the first and second comparison result signals (Ka, Kb), so as to generate the first to sixth control signals (Srp*, Ssp*, Stp*, Srn*, Ssn*, Stn*).

Notably, the first peak range signal (rp) is activated only in a region corresponding to the phase of 60 degrees having the point where the first phase voltage (Vr) takes the maximum value as a center, and in a region corresponding to the phase of 180 degree's having the point where the first phase voltage takes the minimum value as a center.

Further, the second peak range signal (m) is activated only in a region corresponding to the phase of 180 degrees having the point where the first phase voltage takes the maximum value as a center, and in a region corresponding to the phase of 60 degrees having the point where the first phase voltage takes the minimum value as a center.

Furthermore, the third peak range signal (sp) is activated only in a region corresponding to the phase of 60 degrees having the point where the second phase voltage (Vs) takes the maximum value as a center, and in a region corresponding to the phase of 180 degrees having the point where the second phase voltage takes the minimum value as a center.

Further, the fourth peak range signal (sn) is activated only in a region corresponding to the phase of 180 degrees having the point where the second phase voltage takes the maximum value as a center, and in a region corresponding to the phase of 60 degrees having the point where the second phase voltage takes the minimum value as a center.

Furthermore, the fifth peak range signal (tp) is activated only in a region corresponding to the phase of 60 degrees having the point where the third phase voltage (Vt) takes the maximum value as a center, and in a region corresponding to the phase of 180 degrees having the point where the third phase voltage takes the minimum value as a center.

Further, the sixth peak range signal (tn) is activated only in a region corresponding to the phase of 180 degrees having the point where the third phase voltage takes the maximum value as a center, and in a region corresponding to the phase of 60 degrees having the point where the third phase voltage takes the minimum value as a center.

According to the third aspect of the AC/DC converter device according to the present invention, in either one of the first and second aspects, the current command value repeatedly takes a rising waveform rising in the region corresponding to the phase of 60 degrees, and a falling waveform falling in the region corresponding to the phase of 60 degrees. When the minimum value and the maximum value of the carrier are supposed to be m and M, respectively, the rising waveform takes a value $((m+M)+\sqrt{3}\cdot(M-m)\cdot\tan(\phi-\pi/6))/2$ with respect to a phase angle $\phi$ that has a point where the rising waveform starts to rise as a starting point. The falling waveform takes a value $((m+M)-\sqrt{3}\cdot(M-m)\cdot\tan(\phi-\pi/6))/2$ with respect to a phase angle 4) that has a point where the falling waveform starts to fall as a starting point.

Effect of the Invention

According to the first aspect of the AC/DC converter device according to the present invention, the number of command values, which should be compared to a carrier, can be reduced, compared to a conventional AC/DC converter device having a current source active converter.

According to the second aspect of the AC/DC converter device according to the present invention, the comparison result signal allocating portion can simply be configured.

According to the third aspect of the AC/DC converter device according to the present invention, an input current can be shaped into a sine wave, so that a generation of harmonics can be suppressed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a circuit diagram of an AC/AC converter device using the AC/DC converter device according to the embodiment of the present invention;

FIG. 3 is a circuit diagram illustrating a configuration of a switching element employed in the AC/DC converter device;

FIG. 4 is a circuit diagram illustrating a configuration of a switching element employed in a DC/AC converter device;

EMBODIMENT FOR CARRYING OUT THE INVENTION

Figure 1:
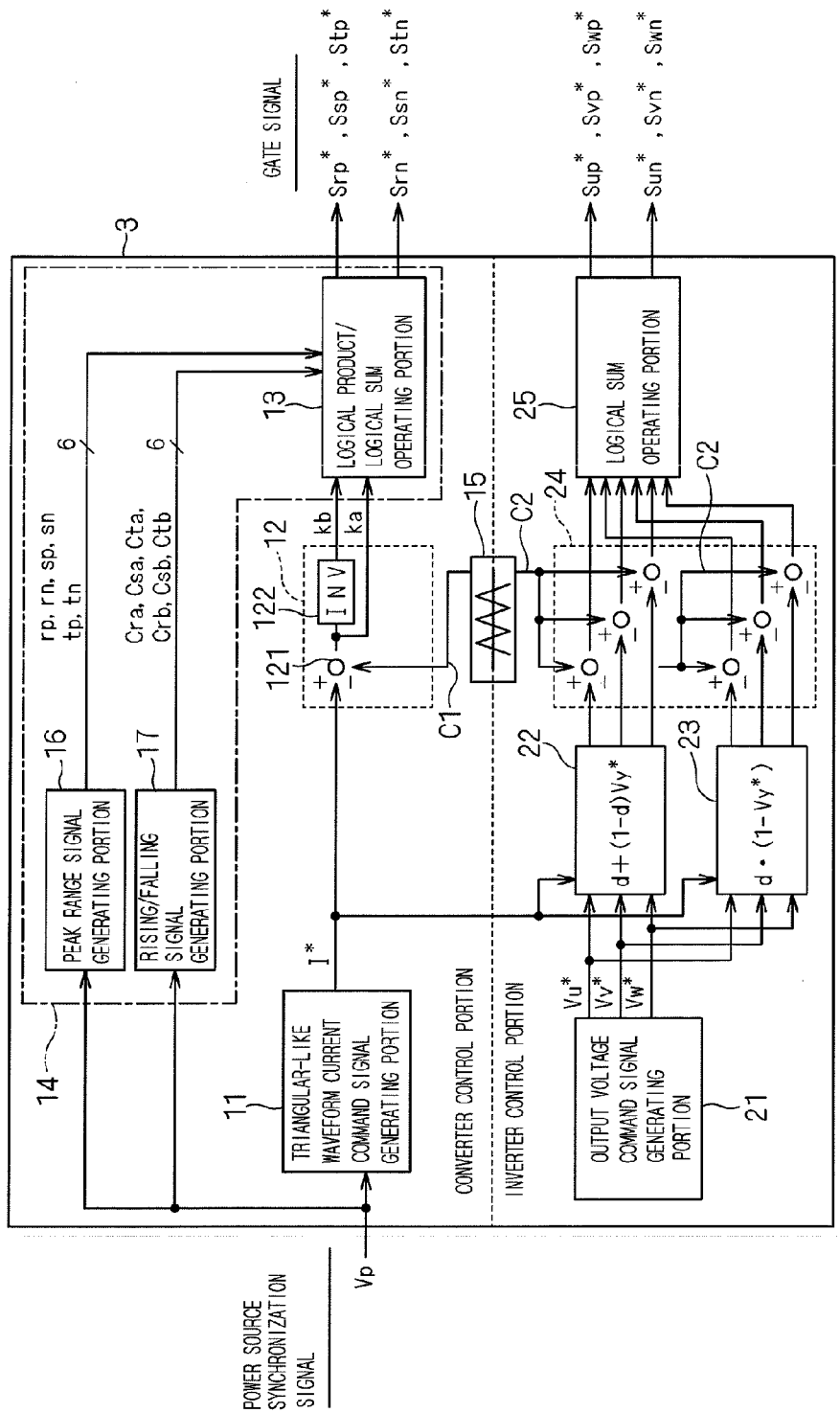
FIG. 1 is a block diagram of a control circuit that controls an AC/DC converter device according to an embodiment of the present invention.

FIG. 2 is a circuit diagram of an AC/AC converter device using an AC/DC converter device 1 according to an embodiment of the present invention. The AC/DC converter device 1 constitutes a direct power converter device together with a DC/AC converter device 2.

The AC/DC converter device 1 and the DC/AC converter device 2 are connected to each other with a pair of DC power source lines LH and LL. Input terminals Pr, Ps, and Pt of the AC/DC converter device 1 are connected to the DC power source line LH through switching elements Srp, Ssp, and Stp, respectively, on an upper arm. Further, the input terminals Pr, Ps, and Pt are also connected to the DC power source line LL through switching elements Sm, Ssn, and Stn, respectively, on a lower arm. Three-phase alternate voltages Vr, Vs, and Vt are applied to the input terminals Pr, Ps, and Pt of the AC/DC converter device 1 from a power source not illustrated. The AC/DC converter device 1 rectifies the phase voltages Vr, Vs, and Vt, which are alternate voltages, so as to output a rectified voltage Vdc having a potential higher at the DC power source line LH than at the DC power source line LL between the DC power source lines LL and LH.

Output terminals Pu, Pv, and Pw of the DC/AC converter device 2 are connected to the DC power source line LH through switching elements Sup, Svp, and Swp, respectively, on the upper arm. The output terminals Pu, Pv, and Pw are also connected to the DC power source line LL through switching elements Sun, Svn, and Swn, respectively, on a lower arm. The output terminals Pu, Pv, and Pw of the DC/AC converter device 2 output the three-phase alternate voltage.

The AC/DC converter device 1 is a current source active converter, in which the switching elements Srp, Ssp, and Stp apply current only toward the DC power source line LH from themselves, and the switching elements Sm, Ssn, and Stn flow current only from the DC power source line LL to themselves.

FIG. 3 is a circuit diagram illustrating the configuration of the switching element employed in the AC/DC converter device 1. As illustrated in part (a) of FIG. 3, the switching element employed in the AC/DC converter device 1 can be configured to include a high-speed diode and an IGBT connected to each other in series. Alternatively, a reverse blocking IGBT may be employed as illustrated in part (b) of FIG. 3. Here, a character x represents characters r, s, and t.

The DC/AC converter device 2 is a voltage source inverter, and the configuration of the switching element employed in this inverter is illustrated in FIG. 4. The switching element employed for the DC/AC converter device 2 can use an IGBT with a free-wheeling diode, for example. A character y represents characters u, v, and w. In order to prevent short-circuiting among the output terminals Pu, Pv, and Pw, the switching elements Sup, Svp, and Swp on the upper arm of the DC/AC converter device 2 and the switching elements Sun, Svn, and Swn on the lower arm of the DC/AC converter device 2 are selectively conducted, respectively. Further, in order to prevent short-circuiting between the DC power source lines LH and LL, the switching elements on the upper arm and the switching elements on the lower arm, which correspond to the same phase, in the DC/AC converter device 2 are also selectively conducted.

It is supposed that the current (line current) inputted to the input terminals Pr, Ps, and Pt are set as line currents Ir, Is, and It, respectively. In this case, it is desirable that the line currents Ir, Is, and It have a sine wave in order to suppress the generation of harmonics of the power source. In view of this, a current command value for shaping the line currents Ir, Is, and It into a sine wave will briefly be described with reference to Japanese Patent Nos. 4135026, 4135027, 4270316 and 4301336.

Figure 5:
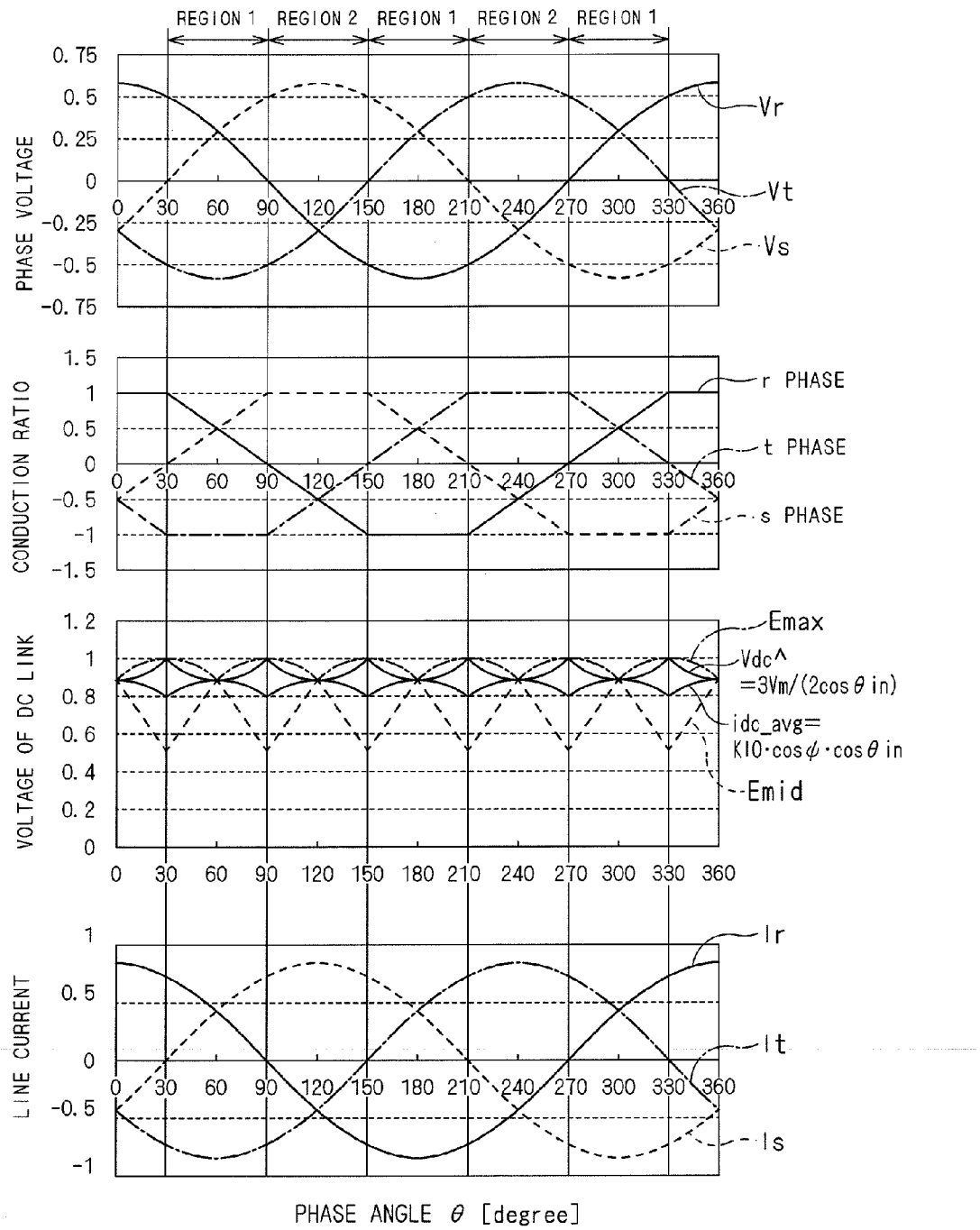
FIG. 5 is a graph illustrating a behavior of a specification in the AC/DC converter device.

FIG. 5 is a graph illustrating the phase voltages Vr, Vs, and Vt inputted respectively to the input terminals Pr, Ps, and Pt of the AC/DC converter device 1, the conduction ratio (duty) of each phase, the voltage between the DC power source lines LH and LL, and the input currents Ir, Is, and It. Each of the phase voltages Vr, Vs, and Vt are classified into either one of a region 1 in which two phase voltages are positive and the remaining one is negative, and a region 2 in which two phase voltages are negative, and the remaining one is positive. These regions 1 and 2 repeatedly and alternately appear at every 60 degrees of the phase angle. Specifically, the phase voltages Vr, Vs, and Vt are based upon equations described below.

$$Vr = Vm \cdot \cos(\theta),$$

$$Vs = Vm \cdot \cos(\theta - 2\pi/3),$$

$$Vt = Vm \cdot \cos(\theta + 2\pi/3),$$

$$Vm = 1/\sqrt{3} \tag{1}$$

In each of the regions 1 and 2, the switching element is always conducted for the phase (maximum phase or minimum phase) having the maximum absolute value of the phase voltage, and the switching element is conducted with a predetermined conduction ratio for the other two phases (these have a polarity reverse to that of the maximum phase or the minimum phase).

The positive conduction ratio represents the duty of the switching elements Srp, Ssp, and Stp, while the negative conduction ratio represents the duty of the switching elements Sm, Ssn, and Stn. The switching element connected to the DC power source line LL is always conducted for the phase corresponding to the minimum phase, so that the conduction ratio is −1, while the switching element connected to the DC power source line LH is always conducted for the phase corresponding to the maximum phase, so that the conduction ratio is 1.

Since the switching element corresponding to the maximum phase or the minimum phase is always conducted, two potentials that are a line voltage Emax between the maximum phase and the minimum phase and a line voltage Emid between the minimum phase and an intermediate phase (in the region 1) or between the maximum phase and the intermediate phase (in the region 2) are acquired in the rectified voltage Vdc. Further, an average Vdc^ of the rectified voltage Vdc is acquired by multiplying the respective conduction ratios, and is expressed as described below, in which the average Vdc^ has a pulsating voltage waveform through the switching with the above-mentioned conduction ratio.

$Vdc\hat{} = 3Vm/(2\cos\theta in)$, $$\cos\theta in = \max(|\cos\theta r|, |\cos\theta s|, |\cos\theta t|) \qquad (2)$$

A current idc_avg flowing through the DC power source lines LH and LL is represented as $k \cdot I0 \cdot \cos\psi \cdot \cos\theta in$, wherein the amplitude of the output current of the inverter is set as I0. It is to be noted that k is a modulation ratio, satisfying $0 < k < \sqrt{3}/2$, and $\psi$ is a phase difference between the output voltage and the output current.

In the AC/DC converter device 1, one phase is conductive, while two phases are switched with the respective conduction ratios, so that the line currents Ir, Is, and It of the respective phases are expressed as described below in a region having a phase angle of 30 degrees to 90 degrees, for example.

$Ir = drt \cdot idc\_avg = k \cdot I0 \cdot \cos\psi \cdot \cos\theta r$ $Is = dst \cdot idc\_avg = k \cdot I0 \cdot \cos\psi \cdot \cos\theta s$ $$It = -idc\_avg = k \cdot I0 \cdot \cos\psi \cdot \cos\theta t \qquad (3)$$

The same result can be obtained for the other phase angles, and therefore, the line currents Ir, Is, and It can be shaped into a sine wave.

In the conduction ratio, an absolute value of a waveform in a region (hereinafter referred tentatively to as a "tilt region") where the conduction ratio tilts can be commonly expressed with respect to the tilt regions of the respective phases because of the symmetry of the phase voltages Vr, Vs, and Vt, if a phase angle $\phi$ ($0 \le \phi \le \pi/3$) is individually introduced for each of the regions 1 and 2. The conduction ratio will be expressed as described below in a region where the conduction ratio increases with the increase in the phase angle $\phi$.

$$\sin\phi/\sin(\phi+\pi/3) = \left(\sqrt{3}\cdot\sin(\phi-\pi/6)/\sin(\phi+\pi/3)+1\right)/2 \qquad (4)$$
$$= \left(1+\sqrt{3}\tan(\phi-\pi/6)\right)/2$$

Similarly, the conduction ratio is expressed as $(1+\sqrt{3}\tan(\phi-\pi/6))/2$ in a tilt region where the conduction ratio decreases with the increase in the phase angle $\phi$.

If the switching element in the AC/DC converter device 1 is controlled with a pulse signal acquired through a pulse width modulation using such a conduction ratio as a command value to a carrier C1, the switching according to the conduction ratio is executed. Therefore, if the conduction ratio described above is employed as the current command value, the line currents Ir, Is, and It inputted to the AC/DC converter device 1 can be formed to have a sine wave.

Of course, the above-mentioned expression is different, if the amplitude and central value of the carrier C1 are different. For example, when the minimum value and the maximum value of the carrier C1 are supposed to be m and M, respectively, the amplitude thereof becomes (M−m)/2, and the central value becomes (M+m)/2, so that the conduction ratio is expressed as described below in a tilt region where the conduction ratio increases with the increase in the phase angle $\phi$.

$$((m+M)+\sqrt{3}\cdot(M-m)\cdot\tan(\phi-\pi/6))/2 \qquad (5)$$

Furthermore, the conduction ratio is expressed as described below in a tilt region where the conduction ratio decreases with the increase in the phase angle $\phi$.

$$((m+M)-\sqrt{3}\cdot(M-m)\cdot\tan(\phi-\pi/6))/2 \qquad (6)$$

As described above, the positive conduction ratio in FIG. 5 represents the duties of the switching elements Srp, Ssp, and Stp, while the negative conduction ratio in FIG. 5 represents the duties of the switching elements Srn, Ssn, and Stn. Therefore, in Japanese Patent No. 4135027, a command value is separated for the positive conduction ratio and for the negative conduction ratio, in order to individually execute the comparison to the carrier.

Figure 9:
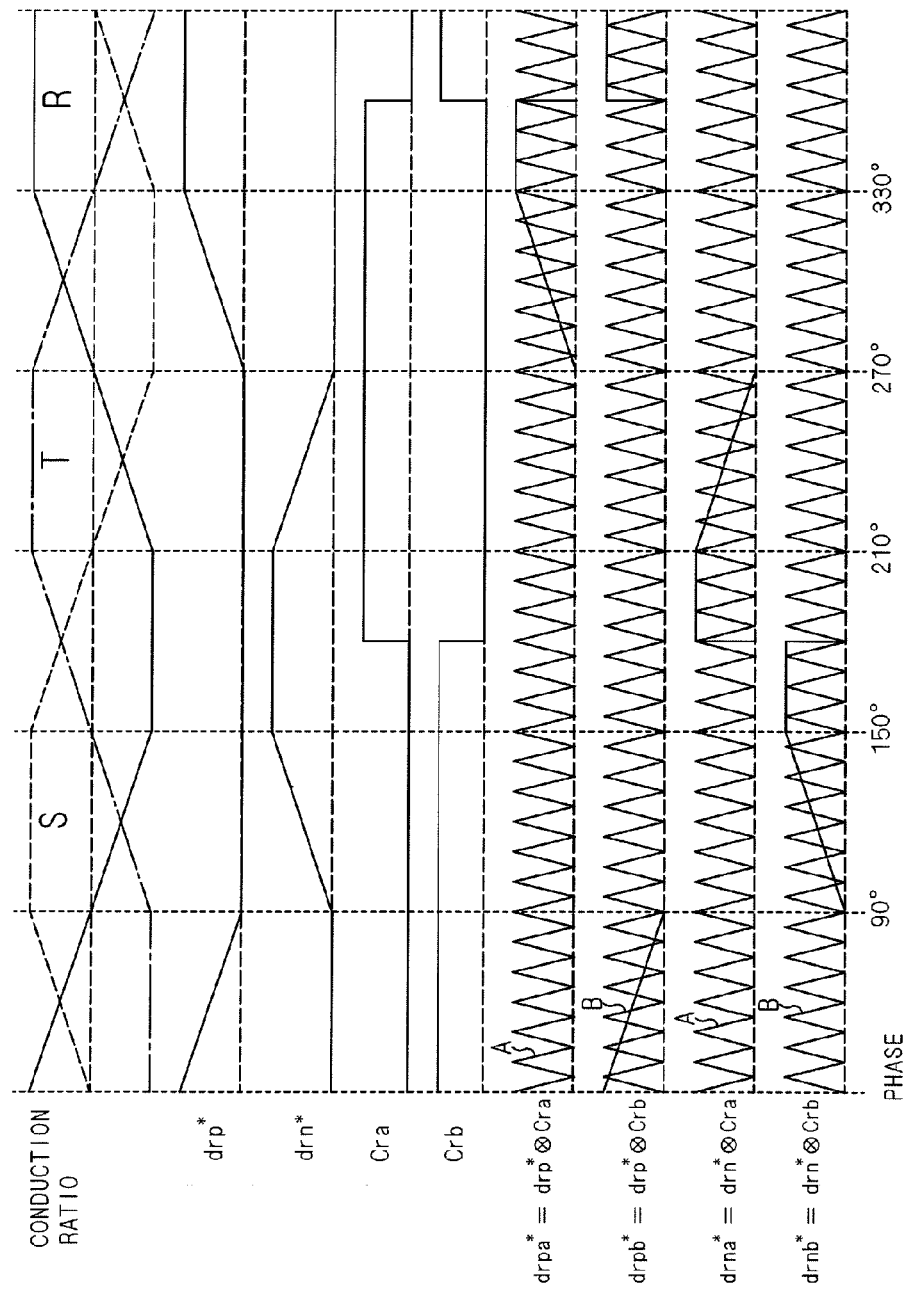
FIG. 9 is a graph illustrating the comparison between the carrier and the command value.

FIG. 9 is a graph illustrating the comparison between the carrier and the command value employed in Japanese Patent No. 4135027. The uppermost row in FIG. 9 indicates the conduction ratio of R phase, S phase and T phase, while the graphs below the uppermost row indicate the waveform based upon the conduction ratio of the R phase.

A conduction command drp* is a conduction ratio corresponding to the positive conduction ratio, while a conduction command drn* is a conduction ratio corresponding to the negative conduction ratio. Signal distributing signals Cra and Crb have waveforms formed by advancing each of the waveforms of the conduction commands drp* and drn* at an angle of 90 degrees and shaping the resultant.

In one phase that is the R phase, four signal waves drpa*, drpb*, drna*, and drab* are generated, and they are compared to two carriers A and B. The carriers A and B are shifted from each other at an angle of 180 degrees in terms of the phase of the carrier, i.e., each of the carriers A and B has the waveforms in which the peaks and valleys are reverse to each other.

Specifically, the signal wave drpa* is a logical product of the conduction command drp* and the signal distributing signal Cra, the signal wave drpb* is a logical product of the conduction command drp* and the signal distributing signal Crb, the signal wave drna* is a logical product of the conduction command drn* and the signal distributing signal Cra, and the signal wave drab* is a logical product of the conduction command drn* and the signal distributing signal Crb (an encircled mark x in FIG. 9 indicates the logical product).

The signal waves drpa* and drna* are compared to the carrier A, while the signal waves drpb* and drab* are compared to the carrier B.

Figure 10:
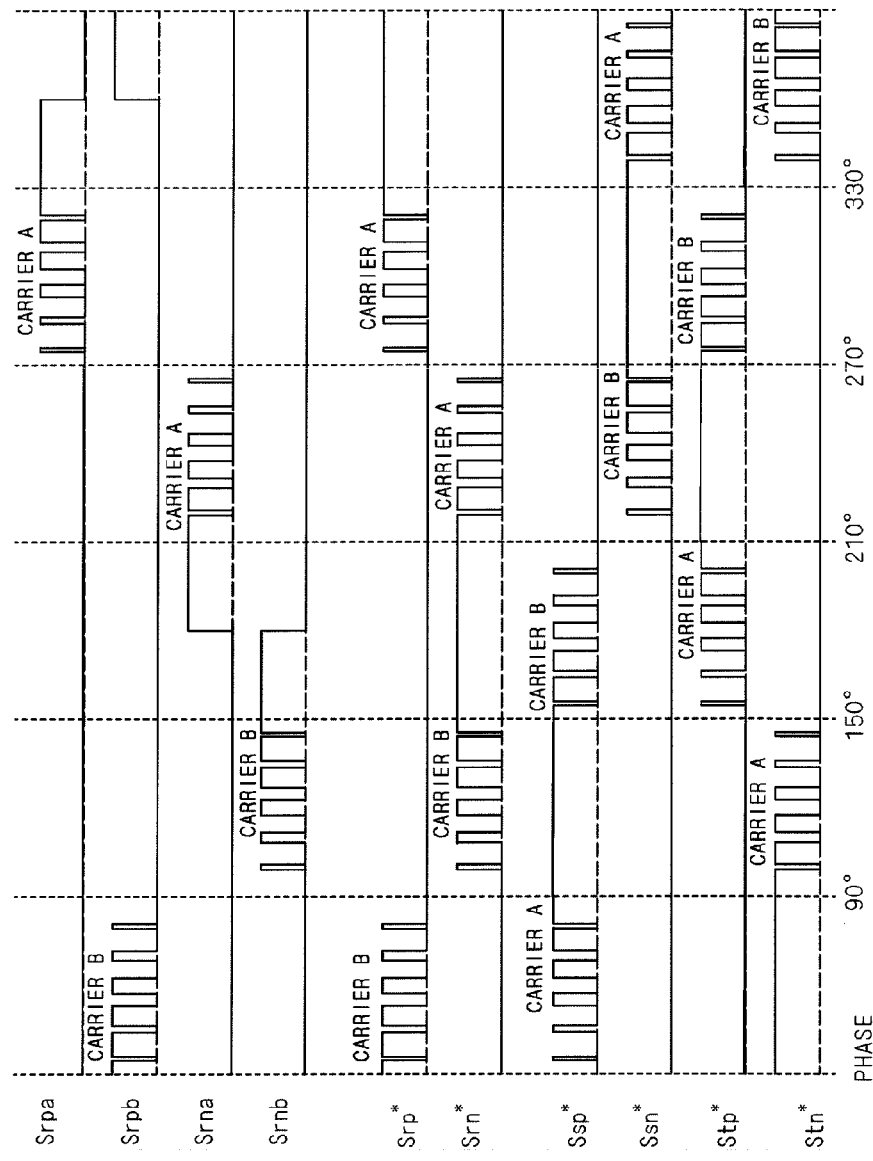
FIG. 10 is a graph illustrating a pulse train acquired from the comparison between a signal wave and the carrier.

FIG. 10 is a graph illustrating a pulse train obtained by the comparison between the signal wave and the carrier, wherein the upper six rows indicate the generation of the gate signal for the R phase. Specifically, the pulse signal Srpa is acquired by the comparison between the signal wave drpa* and the carrier A, the pulse signal Srpb is acquired by the comparison between the signal wave drpb* and the carrier B, the pulse signal Srna is acquired by the comparison between the signal wave dma* and the carrier A, and the pulse signal Srnb is acquired by the comparison between the signal wave dmb* and the carrier B. The gate signal Srp* is acquired by the logical sum of the pulse signals Srpa and Srpb, and the gate signal Srn* is acquired by the logical sum of the pulse signals Srna and Srnb. Similarly, gate signals Ssp* and Ssn* for the S phase and gate signals Stp* and Stn* for the T phase are acquired (lower four rows in FIG. 10).

The signal waves drpa* and dma* and the carrier A are compared in a phase of 210 to 330 degrees, and when the conduction commands drp* and dm* are synthesized in this region, a triangular waveform is formed. Similarly, the signal waves drpb* and drnb* and the carrier B are compared in a phase of 30 to 150 degrees, and when the conduction commands drp* and dm* are synthesized in this region, a triangular waveform is also formed.

From this viewpoint, the gate signal for controlling the conduction/non-conduction of the switching element is easily generated as described below in the present embodiment.

Figure 6:
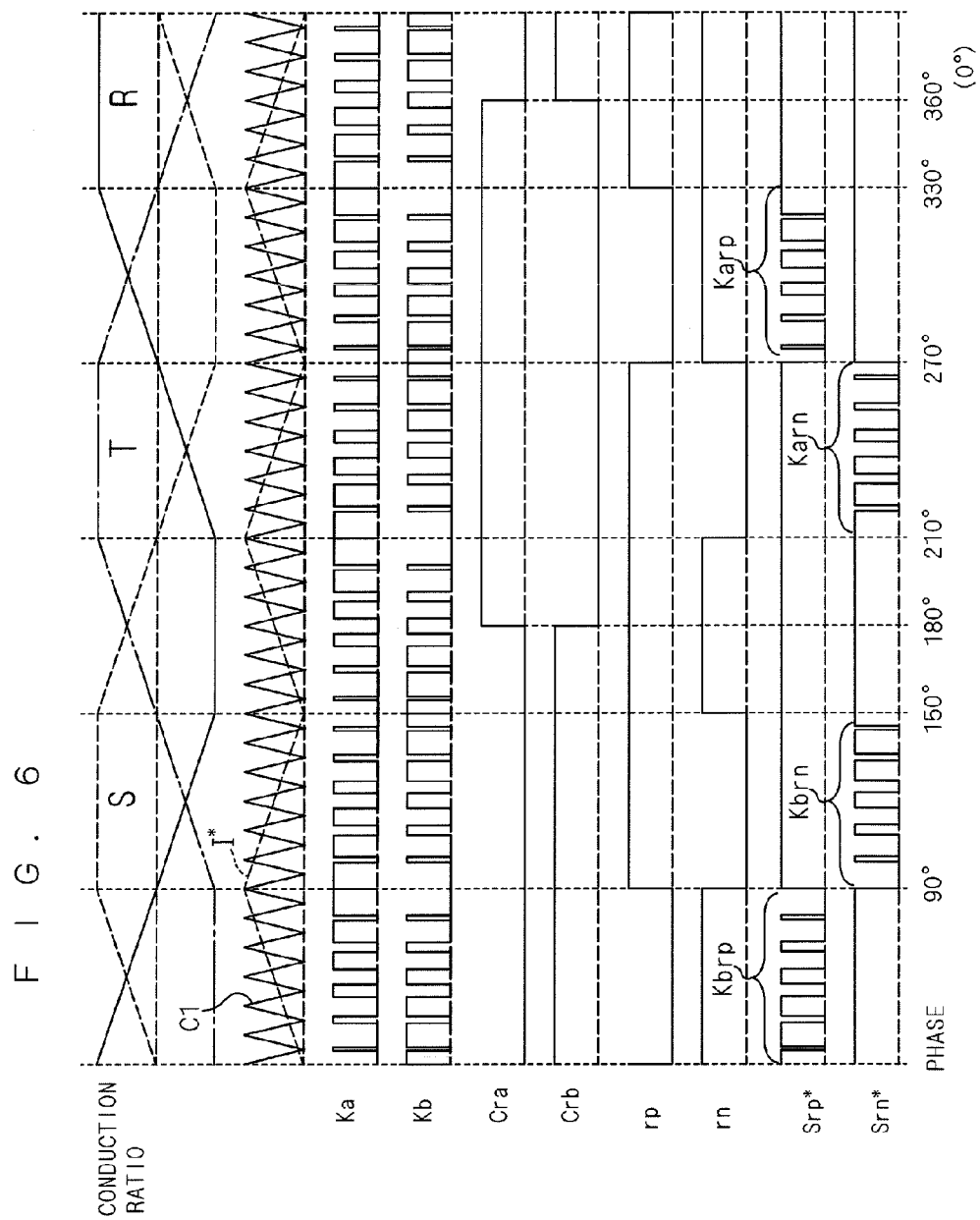
FIG. 6 is a graph illustrating a process by which a gate signal is acquired from a comparison between a carrier and a command value.

FIG. 6 is a graph illustrating the process by which the gate signals Srp* and Srn* are obtained from the comparison between the carrier and the command values. The uppermost row in FIG. 6 indicates the conduction ratio of the R phase, the S phase, and the T phase. The command value I* and the carrier C1 used in the present embodiment are illustrated immediately below the conduction ratio.

The command value I* is a current command value with a triangular wave having a cycle that is ⅓ of the cycles of the three-phase voltages Vr, Vs, and Vt. In other words, the cycle of the command value I* is 120 degrees in terms of the phases of the three-phase voltages Vr, Vs, and Vt, and repeatedly has a rising waveform rising in a region corresponding to the phase of 60 degrees (=π/6 radians) of the three-phase voltage, and a falling waveform falling in the region corresponding to the phase of 60 degrees.

The carrier C1 has a triangular waveform with a cycle shorter than the cycle of the command value I*. Here, the case in which the cycle of the carrier C1 is 1/12 of the cycle of the command value I* is illustrated for simplifying the drawing, but a shorter cycle can be applied.

The carrier C1 having the phase same as the phase of the carrier A illustrated in FIG. 9 is illustrated. The command value I* has a waveform corresponding to the logical sum of the signal waves drpa* and drna*, compared to the carrier A in FIG. 9, in the phase of 210 to 330 degrees. Accordingly, the comparison between the carrier C1 and the command value I* is equivalent to the comparison between the carrier A and the signal waves drpa* and drna* in the phase of 210 to 330 degrees.

The command value I* has a waveform in which the waveform corresponding to the logical sum of the signal waves drpb* and drab*, compared to the carrier B in FIG. 9, is turned upside down to reverse the peak and valley, in the phase of 30 to 150 degrees. Considering that the mountain and valley are inversed in the waveforms of the carries A and B, the comparison between the carrier C1 and the command value I* is equivalent to the comparison between the carrier B and the signal waves drpb* and drab* in the phase of 30 to 150 degrees.

From the above, it is understood that the desirable pulse waveform is acquired by the comparison between the carrier C1 and the command I* in the region of the phase where the pulse width modulation is executed.

More specifically, a comparison result signal Ka illustrated in FIG. 6 is a pulse signal indicating the result of the comparison between the carrier C1 and the command value I*, wherein the signal Ka is activated when the carrier C1 is not more than the command value I*, and is non-activated when the carrier C1 exceeds the command value I* (or the signal Ka is activated when the carrier C1 is less than the command value I*, and the signal Ka is non-activated when the carrier C1 is not less than the command value I*). A comparison result signal Kb is a complementary pulse signal of the comparison result signal Ka.

In a region corresponding to the phase of 60 degrees having the point where the phase progresses by 30 degrees from the point where the phase voltage Vr takes the maximum value at the phase of 0 degree (see FIG. 5) as a starting point, i.e., in a region of the phase of 30 degrees to 90 degrees, a portion Kbrp of the comparison result signal Kb present in this region is employed as the gate signal Srp*. In a region corresponding to the phase of 60 degrees having the point on the phase of 270 degrees where the phase progresses by 90 degrees from the point where the phase voltage Vr takes the minimum value at the phase of 180 degrees as a starting point, i.e., in a region of the phase of 270 degrees to 330 degrees, a portion Karp of the comparison result signal Ka present in this region is employed as the gate signal Srp*.

Similarly, in a region corresponding to the phase of 60 degrees having the point where the phase progresses by 30 degrees from the point where the phase voltage Vr takes the minimum value at the phase of 180 degrees as a starting point, i.e., in a region of the phase of 210 degrees to 270 degrees, a portion Karn of the comparison result signal Ka present in this region is employed as the gate signal Srn*. Moreover, in a region corresponding to the phase of 60 degrees having the point where the phase progresses by 90 degrees from the point where the phase voltage Vr takes the maximum value at the phase of 0 degree as a starting point, i.e., in a region of the phase of 90 degrees to 150 degrees, a portion Kbrn of the comparison result signal Kb present in this region is employed as the gate signal Srn*.

In this way, the desirable pulse waveform is obtained in the region of the phase where the pulse width modulation is executed.

With reference to FIG. 10, the gate signal Srp* is non-activated (corresponding to logic low, and turns the switching element Srp into the non-conducted state) in the phase of 90 to 270 degrees, but it may actually be activated (corresponding to logic high, and turns the switching element Srp into an conducted state). This is because the voltage Vr does not have the maximum phase in this phase region with reference to FIG. 5, and even if the switching element Srp is conducted as describe above, the direction of the current flowing through the switching element Srp is limited to the direction toward the DC power source line LH from the input terminal Pr. Specifically, even if the switching element Srp is conducted in the phase of 90 to 270 degrees, no problem occurs in the operation of the AC/DC converter device 1. Since the same is applied to the other gate signals, any switching elements may be conducted in the region other than the region of the phase of 60 degrees in which the operation is made in accordance with the pulse width modulation.

Specifically, the gate signal Srp* may be activated in the phase of 90 to 270 degrees, the gate signal Srn* may be activated in the phase of 0 to 90 degrees and in the phase of 270 to 360 degrees, the gate signal Ssp* may be activated in the phase of 210 to 360 degrees and in the phase of 0 to 30 degrees, the gate signal Ssn* may be activated in the phase of 30 to 210 degrees, the gate signal Stp* may be activated in the phase of 0 to 150 degrees and in the phase of 330 to 360 degrees, and the gate signal Stn* may be activated in the phase of 150 to 330 degrees.

In view of this, in the present embodiment, a gate signal that is activated in a region other than the phase region where the pulse width modulation is executed is generated.

Specifically, first, a rising signal Cra that is activated in a period when the phase voltage Vr rises, i.e., in the phase of 180 to 360 degrees, and a falling signal Crb that is activated in a period when the phase voltage Vr falls, i.e., in the phase of 0 to 180 degrees, are acquired with reference to FIG. 6. The signals agree with the signal distribution signals Cra and Crb in the above-mentioned Japanese Patent No. 4135027, so that the same symbols are used.

In addition, peak range signals rp and rn are acquired. The peak range signal rp is activated only in a region (phase of 330 to 360 degrees, 0 to 30 degrees) corresponding to the phase of 60 degrees having the point (phase of 0 degree) where the phase voltage Vr takes the maximum value as a center, and in a region (phase of 90 to 270 degrees) corresponding to the phase of 180 degrees having the point (phase of 180 degrees) where the phase voltage Vr takes the minimum value as a center. The peak range signal rn is activated only in a region (phase of 90 to 270 degrees) corresponding to the phase of 180 degrees having the point (phase of 0 degree) where the phase voltage Vr takes the maximum value as a center, and in a region (phase of 150 to 210 degrees) corresponding to the phase of 60 degrees having the point (phase of 180 degrees) where the phase voltage Vr takes the minimum value as a center.

Furthermore, the region where the rising signal Cra is activated (accordingly, the falling signal Crb is non-activated) includes the region where the comparison result signal Ka is employed as the gate signals Srp* and Srn*. The region where the falling signal Crb is activated (accordingly, the rising signal Cra is non-activated) includes the region where the comparison result signal Kb is employed as the gate signals Srp* and Srn*.

The region where the peak range signal rp is non-activated is the region where the gate signal Srp* shows the pulse to which the pulse width modulation is performed, while the region where the peak range signal rn is non-activated is the region where the gate signal Srn* shows the pulse to which the pulse width modulation is performed.

Accordingly, the gate signals Srp* and Srn* are obtained from the operation described below. It is to be noted that an encircled x mark indicates logical product, an encircled+ mark indicates logical sum, and an upper line indicates logical inversion. Similar to four general arithmetic operations, the logical product is operated in priority to logical sum.

$$Srp = rp \oplus \overline{rp} \otimes (Ka \otimes Cra \oplus Kb \otimes Crb),$$

$$Srn = rn \oplus \overline{rn} \otimes (Ka \otimes Cra \oplus Kb \otimes Crb) \quad (7)$$

It is apparent that the gate signals Srp* and Srn* thus obtained and the gate signals Srp* and Srn* illustrated in FIG. 10 are identical in the region in which the gate signals are subject to the pulse width modulation. Therefore, the gate signals Srp* and Srn* obtained by using the comparison result signals Ka and Kb, the peak range signals rp and rn, the rising signals Cra, and the falling signal Crb can be employed as the gate signal for the AC/DC converter device 1 serving as the current active converter.

Figure 7:
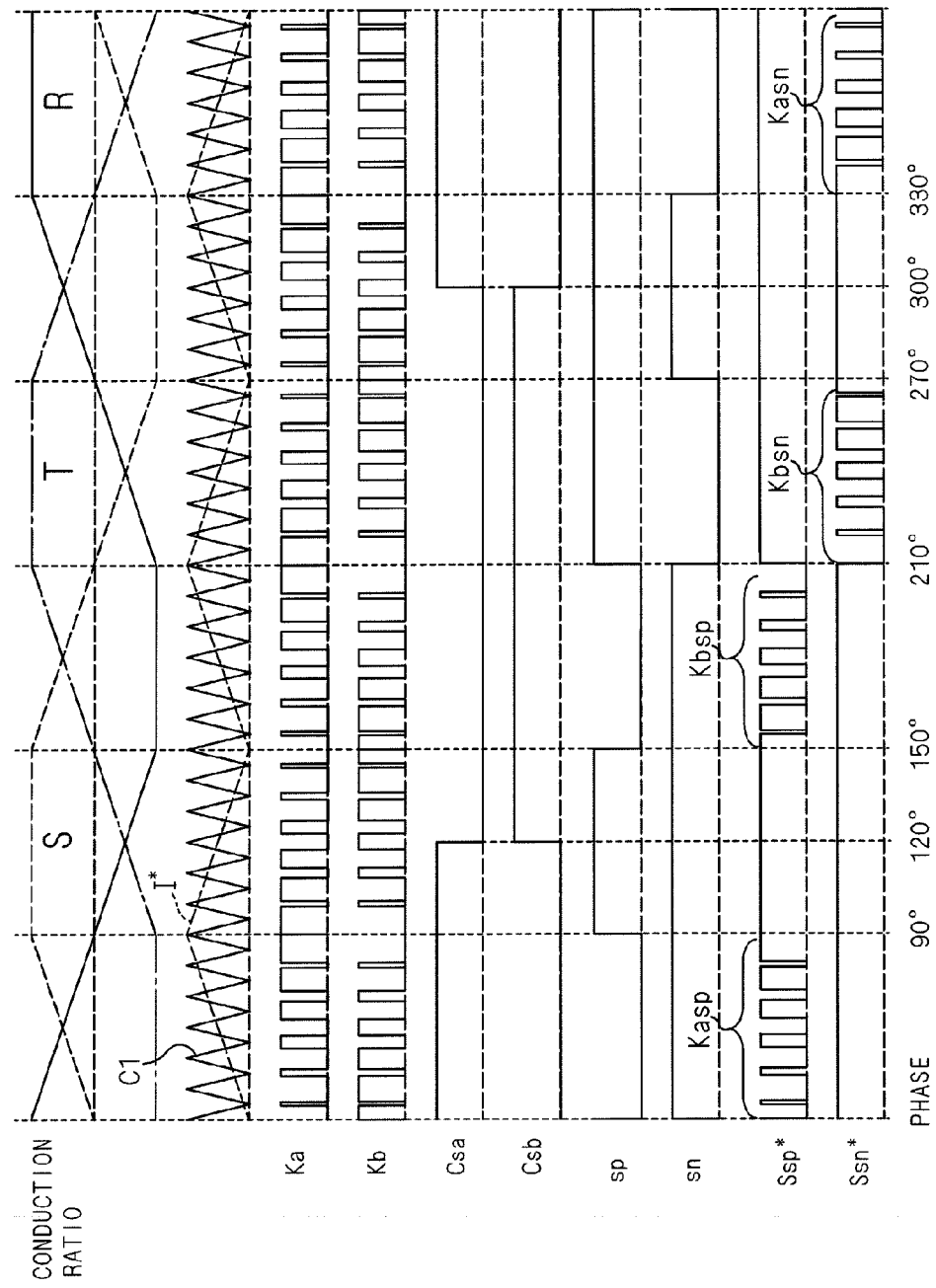
FIG. 7 is a graph illustrating a process by which the gate signal is acquired from the comparison between the carrier and the command value.

FIG. 7 is a graph illustrating a process by which the gate signals Ssp* and Ssn* are obtained from the comparison between the carrier and the command value. As in FIG. 6, the uppermost row illustrates the conduction ratio of the R phase, S phase, and T phase. The comparison result signals Ka and Kb are obtained as described with reference to FIG. 6.

In a region corresponding to the phase of 60 degrees having the point where the phase progresses by 30 degrees from the point where the phase voltage Vs takes the maximum value (see FIG. 5) at the phase of 120 degrees as a starting point, i.e., in a region of the phase of 150 to 210 degrees, a portion Kbsp of the comparison result signal Kb present in this region is employed as the gate signal Ssp*. Further, in a region corresponding to the phase of 60 degrees having the point on the phase of 30 degrees where the phase progresses by 90 degrees from the point where the phase voltage Vs takes the minimum value at the phase of 300 degrees as a starting point, i.e., in a region of the phase of 30 to 90 degrees, a portion Kasp of the comparison result signal Ka present in this region is employed as the gate signal Ssp*.

Similarly, in a region corresponding to the phase of 60 degrees having the point where the phase progresses by 30 degrees from the point where the phase voltage Vs takes the minimum value at the phase of 300 degrees as a starting point, i.e., in a region of the phase of 330 to 360 degrees, a portion Kasn of the comparison result signal Ka present in this region is employed as the gate signal Ssn*. In a region corresponding to the phase of 60 degrees having the point where the phase progresses by 90 degrees from the point where the phase voltage Vs takes the maximum value at the phase of 120 degrees as a starting point, i.e., in a region of the phase of 210 to 270 degrees, a portion Kbsn of the comparison result signal Kb present in this region is employed as the gate signal Ssn*.

As described above, the desirable pulse waveform is also obtained for the S phase in the phase region where the pulse width modulation is executed.

A rising signal Csa that is activated in a period when the phase voltage Vs rises, i.e., in the phase of 300 to 360 degrees and in the phase of 0 to 120 degrees, and a falling signal Csb that is activated in a period when the phase voltage Vs falls, i.e., in the phase of 120 to 300 degrees, are acquired.

In addition, peak range signals sp and sn are acquired. The peak range signal sp is activated only in a region (phase of 90 to 150 degrees) corresponding to the phase of 60 degrees having the point (phase of 120 degrees) where the phase voltage Vs takes the maximum value as a center, and a region (phase of 210 to 360 degrees, 0 to 30 degrees) corresponding to the phase of 180 degrees having the point (phase of 300 degrees) where the phase voltage Vs takes the minimum value as a center. The peak range signal sn is activated only in a region (phase of 30 to 210 degrees) corresponding to the phase of 180 degrees having the point (phase of 120 degrees) where the phase voltage Vs takes the maximum value as a center, and a region (phase of 270 to 330 degrees) corresponding to the phase of 60 degrees having the point (phase of 300 degrees) where the phase voltage Vs takes the minimum value as a center.

The region where the rising signal Csa is activated (accordingly, the falling signal Csb is non-activated) includes the region where the comparison result signal Ka is employed as the gate signals Ssp* and Ssn*. The region where the falling signal Csb is activated (accordingly, the rising signal Csa is non-activated) includes the region where the comparison result signal Kb is employed as the gate signals Ssp* and Ssn*.

Further, the region where the peak range signal sp is non-activated is the region where the gate signal Ssp* shows the pulse to which the pulse width modulation is performed, while the region where the peak range signal sn is non-activated is the region where the gate signal Ssn* shows the pulse to which the pulse width modulation is performed.

Accordingly, the gate signals Ssp* and Ssn* are obtained from the operation described below.

$$Ssp = sp \oplus \overline{sp} \otimes (Ka \otimes Csa \oplus Kb \otimes Csb),$$

$$Ssn = sn \oplus \overline{sn} \otimes (Ka \otimes Csa \oplus Kb \otimes Csb) \quad (8)$$

It is apparent that the gate signals Ssp* and Ssn* thus obtained and the gate signals Ssp* and Ssn* illustrated in FIG. 10 are identical in the region in which the gate signals are subject to the pulse width modulation. Therefore, the gate signals Ssp* and Ssn* obtained by using the comparison result signals Ka and Kb, the peak range signals sp and sn, the rising signals Csa, and the falling signal Csb can be employed as the gate signal for the AC/DC converter device 1 serving as the current active converter.

Figure 8:
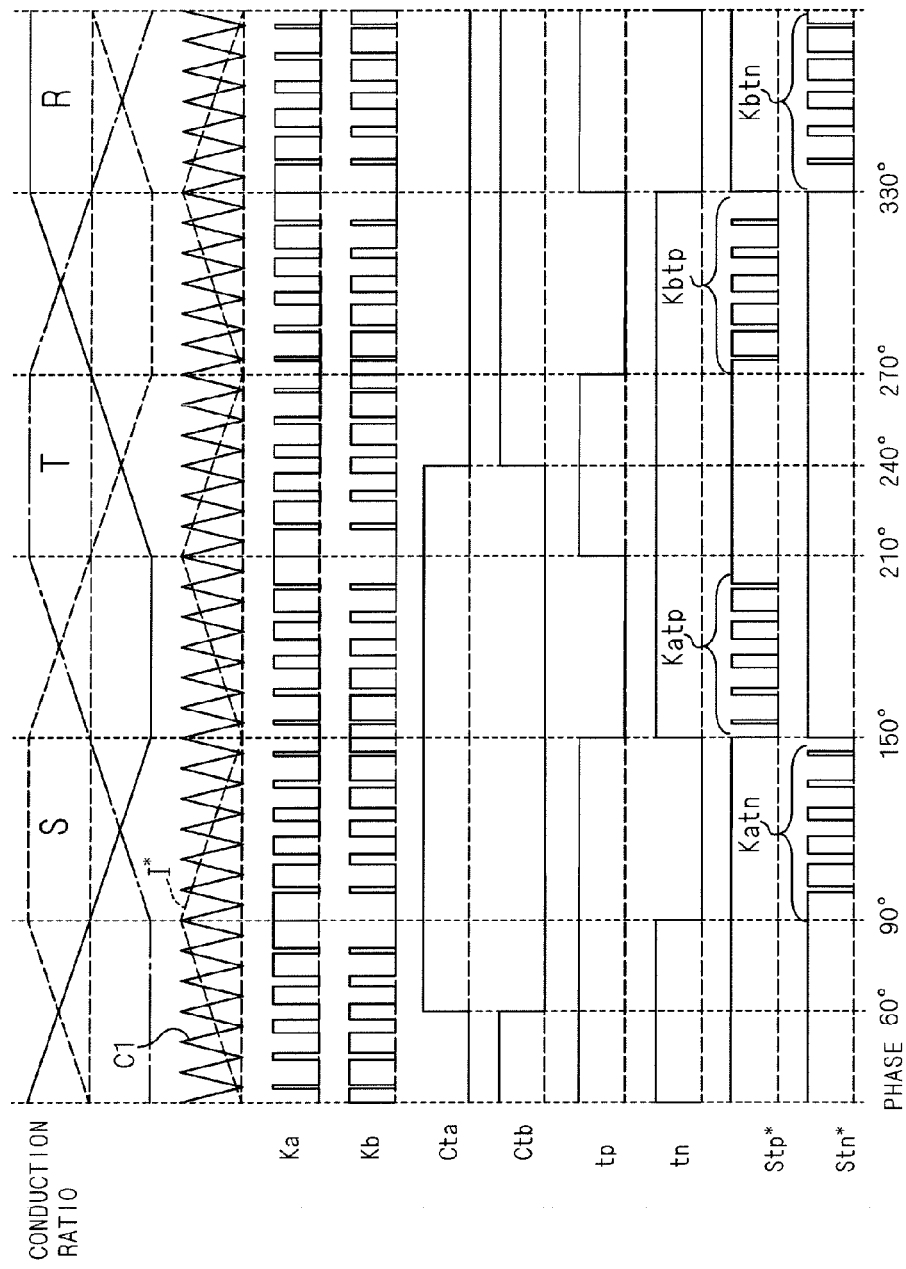
FIG. 8 is a graph illustrating a process by which the gate signal is acquired from the comparison between the carrier and the command value.

FIG. 8 is a graph illustrating a process by which the gate signals Stp* and Stn* are obtained from the comparison between the carrier and the command value. As in FIG. 6, the uppermost row illustrates the conduction ratio of the R phase, S phase, and T phase. The comparison result signals Ka and Kb are obtained as described with reference to FIG. 6.

In a region corresponding to the phase of 60 degrees having the point where the phase progresses by 30 degrees from the point where the phase voltage Vt takes the maximum value (see FIG. 5) at the phase of 240 degrees as a starting point, i.e., in a region of the phase of 270 to 330 degrees, a portion Kbtp of the comparison result signal Kb present in this region is employed as the gate signal Stp*. In a region corresponding to the phase of 60 degrees having the point on the phase of 150 degrees where the phase progresses by 90 degrees from the point where the phase voltage Vt takes the minimum value at the phase of 60 degrees as a starting point, i.e., in a region of the phase of 150 to 210 degrees, a portion Katp of the comparison result signal Ka present in this region is employed as the gate signal Stp*.

Similarly, in a region corresponding to the phase of 60 degrees having the point where the phase progresses by 30 degrees from the point where the phase voltage Vt takes the minimum value at the phase of 60 degrees as a starting point, i.e., in a region of the phase of 90 to 150 degrees, a portion Katn of the comparison result signal Ka present in this region is employed as the gate signal Stn*. Further, in a region corresponding to the phase of 60 degrees having the point where the phase progresses by 90 degrees from the point where the phase voltage Vt takes the maximum value at the phase of 240 degrees as a starting point, i.e., in regions of the phase of 330 to 360 degrees and the phase of 0 to 30 degrees, a portion Kbtn of the comparison result signal Kb present in this region is employed as the gate signal Stn*.

A rising signal Cta that is activated in a period when the phase voltage Vt rises, i.e., in the phase of 60 to 240 degrees, and a falling signal Ctb that is activated in a period when the phase voltage Vt falls, i.e., in the phase of 240 to 360 degrees and in the phase of 0 to 60 degrees, are acquired.

In addition, peak range signals tp and tn are acquired. The peak range signal tp is activated only in a region (phase of 210 to 270 degrees) corresponding to the phase of 60 degrees having the point (phase of 240 degrees) where the phase voltage Vt takes the maximum value as a center, and a region (phase of 0 to 150 degrees, 330 to 360 degrees) corresponding to the phase of 180 degrees having the point (phase of 60 degrees) where the phase voltage Vt takes the minimum value as a center. The peak range signal tn is activated only in a region (phase of 150 to 330 degrees) corresponding to the phase of 180 degrees having the point (phase of 240 degrees) where the phase voltage Vt takes the maximum value as a center, and a region (phase of 30 to 90 degrees) corresponding to the phase of 60 degrees having the point (phase of 60 degrees) where the phase voltage Vt takes the minimum value as a center.

The region where the rising signal Cta is activated (accordingly, the falling signal Ctb is non-activated) includes the region where the comparison result signal Ka is employed as the gate signals Stp* and Stn*. The region where the falling signal Ctb is activated (accordingly, the rising signal Cta is non-activated) includes the region where the comparison result signal Kb is employed as the gate signals Stp* and Stn*.

The region where the peak range signal tp is non-activated is the region where the gate signal Stp* shows the pulse to which the pulse width modulation is performed, while the region where the peak range signal to is non-activated is the region where the gate signal Stn* shows the pulse to which the pulse width modulation is performed.

Accordingly, the gate signals Stp* and Stn* are obtained from the operation described below.

$$Stp = tp \oplus \overline{tp} \otimes (Ka \otimes Cta \oplus Kb \otimes Ctb),$$

$$Stn = tn \oplus \overline{tn} \otimes (Ka \otimes Cta \oplus Kb \otimes Ctb) \quad (9)$$

It is apparent that the gate signals Stp* and Stn* thus obtained and the gate signals Stp* and Stn* illustrated in FIG. 10 are identical in the region in which the gate signals are subject to the pulse width modulation. Therefore, the gate signals Stp* and Stn* obtained by using the comparison result signals Ka and Kb, the peak range signals tp and tn, the rising signals Cta, and the falling signal Ctb can be employed as the gate signal for the AC/DC converter device 1 serving as the current active converter.

As is understood from the above description, the comparison result signals Ka and Kb can commonly be used for the generation of the gate signal for any one of the R phase, S phase, and T phase. Therefore, compared to the conventional technique described in Japanese Patent No. 4135027, the number of the command values that should be compared to the carrier can be reduced, i.e., only one command value I* is necessary.

For example, when the minimum value and the maximum value of the carrier C1 are supposed to be m and M, respectively, the rising waveform of the command value I* takes the above-mentioned equation (5) with respect to the phase angle φ (radian) having the point where the rising waveform starts to rise as a starting point. The falling waveform of the command value I* takes the above-mentioned equation (6) with respect to the phase angle φ having the point where the falling waveform starts to fall as a starting point. The command value I* takes such waveforms, whereby the input current can be shaped into the sine wave, so that the generation of harmonics can be suppressed.

FIG. 1 illustrates the configuration of the control circuit 3 illustrated in FIG. 2. The control circuit 3 outputs the gate signals Srp*, Srn*, Ssp*, Ssn*, Stp*, and Stn* by using the comparison result signals Ka and Kb, and a later-described power source synchronization signal Vp.

Specifically, the control circuit 3 includes a command signal generating portion 11, a comparing unit 12, and a comparison result signal allocating portion 14.

The command signal generating portion 11 inputs the power source synchronization signal Vp synchronized with the three-phase voltage. For example, the power source synchronization signal Vp can employ a sine wave having the same phase as the phase voltage Vr. The command signal generating portion 11 generates the command value I* serving as the current command signal with the triangular-like waveform from the power source synchronization signal Vp.

The comparing portion 12 outputs the result of the comparison between the carrier C1 and the command value I* as the comparison result signals Ka and Kb. The carrier C1 is generated by the later-described carrier generating portion 15, for example. Here, it is illustrated that the comparing portion 12 includes a comparator 121 and an inverter 122. The comparator 121 outputs the comparison result signal Ka that is activated when the command value I* is larger than the carrier C1 (or when the command value I* is not less than the carrier C1). The inverter 122 outputs the comparison result signal Kb by inverting the activation/non-activation of the comparison result signal Ka.

The comparison result signal allocating portion 14 inputs the comparison result signals Ka and Kb so as to generate the gate signals Srp*, Srn*, Ssp*, Ssn*, Stp*, and Stn*.

The comparison result signal allocating portion 14 includes a rising/falling signal generating portion 17, a peak range signal generating portion 16, and an logical product/logical sum operating portion 13.

The rising/falling signal generating portion 17 outputs the rising signals Cra, Csa, and Cta, and the falling signals Crb, Csb, and Ctb from the power source synchronization signal Vp. The peak range signal generating portion 16 generates the peak range signals rp, rn, sp, sn, tp, and tn from the power source synchronization signal Vp. The generation described above can be realized by the known technique, so that the detailed description will not be made. The rising/falling signal generating portion 17 and the peak range signal generating portion 16 both commonly input the power source synchronization signal Vp, so that they are not necessarily provided separately.

The logical product/logical sum operating portion 13 performs a logical operation of the equations (7), (8), and (9) by using the comparison result signals Ka and Kb, the peak range signals rp, rn, sp, sn, tp, and tn, the rising signals Cra, Csa, and Cta, and the falling signals Crb, Csb, and Ctb, thereby outputting the gate signals Srp*, Srn*, Ssp*, Ssn*, Stp*, and Stn*. The logical operation described above can be realized by the known technique using the process of the logical product and the logical sum, so that the detailed description will not be made.

As described above, the command generating portion 11, the comparing portion 12, and the comparison result signal allocating portion 14 control the operation of the AC/DC converter device 1, so that they can be grasped as the converter control portion as a whole.

On the other hand, the control portion 3 also has an inverter control portion that controls the DC/AC converter device 2. The inverter control portion is described in detail in Japanese Patent Nos. 4135026, 4135027, 4270316 and 4301336, so that it will briefly be described below.

The control portion 3 includes, as the inverter control portion, an output voltage command signal generating portion 21, a first correcting portion 22, a second correcting portion 23, a comparing portion 24, and a logical sum operating portion 25. Note that the carrier generating portion 15 supply the carrier C1 used in the inverter control portion and the carrier C2 used in the converter control portion, so that the carrier generating portion 15 is considered to belong to either one or both of the inverter control portion and the converter control portion.

The output voltage command generating portion 21 generates output voltage commands Vu*, Vv*, and Vw* for each of U phase, V phase, and W phase. The amplitude of each of the output voltage commands Vu*, Vv*, and Vw* is normalized to 1, for example. The first correcting portion 22 and the second correcting portion 23 input the output voltage commands Vu*, Vv*, and Vw* and the command value I* so as to correct the output voltage commands. Specifically, supposing that the command value I* and both of the carriers C1 and C2 take the minimum value 0 and the maximum value 1, the first correcting portion 22 outputs a sum of a conduction ratio d and a value (1−d) Vy*, and the second correcting portion 23 outputs a product of the conduction ratio d and the value (1−Vy*).

For example, Japanese Patent No. 4135027 describes, as an example, an operation of a converter under the condition that the lower arm in the T phase is always conducted. Considering that the sum of the conduction ratios drt and dst is 1, it is understood that the conduction ratio d and the value (1−d) respectively correspond to the conduction ratios drt and dst. Since the command value I* has the waveform corresponding to the logical sum of the signal waves drpa* and drna* as described above, the first correcting portion 22 and the second correcting portion 23 both can easily acquire the conduction ratio d and the value (1−d) from the command value I*.

The comparing portion 24 compares the carrier C2 to the output voltage command corrected by the first correcting portion 22 and the output voltage command corrected by the second correcting portion 23. The logical sum operating portion 25 takes the logical sum of the comparison result of the comparator 24 to output the gate signals Sup*, Svp*, Swp*, Sun*, Svn*, and Swn* that control the switching elements Sup, Svp, Swp, Sun, Svn, and Swn.

As a matter of course, a configuration of the inverter control portion other than that illustrated here may be employed. However, the configuration of the carrier generating portion 15 is simplified by setting the carriers C1 and C2 in common From this viewpoint, too, the generation of the gate signal according to the present embodiment is desirable, since the present embodiment employs only the carrier C1 for controlling the AC/DC converter device 1.

While the invention has been shown and described in detail, the foregoing description is in all aspects illustrative and the present invention is not restrictive thereto. It is therefore understood that numerous modifications and variations can be devised without departing from the scope of the present invention.

DESCRIPTION OF THE REFERENCE NUMERALS

1 AC/DC converter device
3 Control circuit
11 Command signal generating portion
12 Comparing portion
13 logical product/logical sum operating portion
14 Comparison result signal allocating portion
16 Peak range signal generating portion
17 Rising/falling signal generating portion
C1 Carrier
I* Command value
Ka, Kb Comparison result signal
LH, LL DC power source line
Cra, Csa, Cta Rising signal
Crb, Csb, Ctb Falling signal
Pr, Ps, Pt Input terminal
rp, rn, sp, sn, tp, tn Peak range signal
Srp, Ssp, Stp, Srn, Ssn, Stn Switching element
Srp*, Ssp*, Stp*, Srn*, Ssn*, Stn* Gate signal
Vdc Rectified voltage
Vp Power source synchronization signal
Vr, Vs, Vt Phase voltage

The invention claimed is:

1. An AC/DC converter device comprising:
first to three input terminals to which first to third phase voltages that form three-phase voltage are respectively inputted;
first and second DC power source lines;
a current source active converter including first to third switching elements connected between each of said first to third input terminals and said first DC power source line, and fourth to sixth switching elements connected between each of said first to third input terminals and said second DC power source line; and
a control circuit that generates first to sixth control signals that control conduction/non-conduction of said first to sixth switching elements, wherein said current source active converter outputs rectified voltage having a potential higher at said first DC power source line than at said second DC power source line between the first and second DC power source lines, said first to third switches apply current only in a direction toward said first DC power source line from themselves, said fourth to sixth switches apply current only in a direction from said second DC power source line to themselves, and said control circuit includes:

a command signal generating portion that generates a current command value with a triangular-like waveform having a cycle that is ⅓ of the cycle of said three-phase voltage from a synchronization signal synchronized with said three-phase voltage;

a comparing portion that outputs a result of a comparison between a carrier with a triangular-like waveform having a cycle shorter than the cycle of said current command value and said current command value, as complementary first and second comparison result signals; and a comparison result signal allocating portion that inputs said first and second comparison result signals, wherein said comparison result signal allocating portion outputs, as said first control signal, said second comparison result signal a region corresponding to said phase of 60 degrees having the point where the phase of said three-phase voltage progresses by 30 degrees from the point where said first phase voltage takes the maximum value as a starting point, and said first comparison result signal in a region corresponding to said phase of 60 degrees having the point where said phase progresses by 90 degrees from the point where said first phase voltage takes the minimum value as a starting point, outputs, as said fourth control signal, said first comparison result signal in a region corresponding to said phase of 60 degrees having the point where said phase progresses by 30 degrees from the point where said first phase voltage takes the minimum value as a starting point, and said second comparison result signal in a region corresponding to said phase of 60 degrees having the point where said phase progresses by 90 degrees from the point where said first phase voltage takes the maximum value as a starting point, outputs, as said second control signal, said second comparison result signal in a region corresponding to said phase of 60 degrees having the point where said phase progresses by 30 degrees from the point where said second phase voltage takes the maximum value as a starting point, and said first comparison result signal in a region corresponding to said phase of 60 degrees having the point where said phase progresses by 90 degrees from the point where said second phase voltage takes the minimum value as a starting point, outputs, as said fifth control signal, said first comparison result signal a region corresponding to said phase of 60 degrees having the point where said phase progresses by 30 degrees from the point where said second phase voltage takes the minimum value as a starting point, and said second comparison result signal in a region corresponding to said phase of 60 degrees having the point where said phase progresses by 90 degrees from the point where said second phase voltage takes the maximum value as a starting point, outputs, as said third control signal, said second comparison result signal in a region corresponding to said phase of 60 degrees having the point where said phase progresses by 30 degrees from the point where said third phase voltage takes the maximum value as a starting point, and said first comparison result signal in a region corresponding to said phase of 60 degrees having the point where said phase progresses by 90 degrees from the point where said third phase voltage takes the minimum value as a starting point, and outputs, as said sixth control signal, said first comparison result signal in a region corresponding to said phase of 60 degrees having the point where said phase progresses by 30 degrees from the point where said third phase voltage takes the minimum value as a starting point, and said second comparison result signal in a region corresponding to said phase of 60 degrees having the point where said phase progresses by 90 degrees from the point where said third phase voltage takes the maximum value as a starting point.

2. The AC/DC converter device according to claim 1, wherein said comparison result signal allocating portion includes:

a rising/falling signal generating portion that generates, from said synchronization signal, first to third rising signals that are activated during when said first to third phase voltages respectively rise, and first to third falling signals that are activated during when said first to third phase voltages respectively fall;

a peak range signal generating portion that generates first to sixth peak range signals from said synchronization signal, said first peak range signal being activated only in a region corresponding to said phase of 60 degrees having a point where said first phase voltage takes the maximum value as a center, and in a region corresponding to said phase of 180 degrees having a point where said first phase voltage takes the minimum value as a center, said second peak range signal being activated only in a region corresponding to said phase of 180 degrees having a point where said first phase voltage takes the maximum value as a center, and in a region corresponding to said phase of 60 degrees having a point where said first phase voltage takes the minimum value as a center, said third peak range signal being activated only in a region corresponding to said phase of 60 degrees having a point where said second phase voltage takes the maximum value as a center, and in a region corresponding to said phase of 180 degrees having a point where said second phase voltage takes the minimum value as a center, said fourth peak range signal being activated only in a region corresponding to said phase of 180 degrees having a point where said second phase voltage takes the maximum value as a center, and in a region corresponding to said phase of 60 degrees having a point where said second phase voltage takes the minimum value as a center, said fifth peak range signal being activated only in a region corresponding to said phase of 60 degrees having a point where said third phase voltage takes the maximum value as a center, and in a region corresponding to said phase of 180 degrees having a point where said third phase voltage takes the minimum value as a center, and said sixth peak range signal being activated only in a region corresponding to said phase of 180 degrees having a point where said third phase voltage takes the maximum value as a center, and in a region corresponding to said phase of 60 degrees having a point where said third phase voltage takes the minimum value as a center); and a logical product/logical sum operating portion that generates said first to sixth control signals by performing logical product operation and logical sum operation with use of said first to sixth peak range signals, said first to third rising signals, said first to third falling signals, and said first and second comparison result signals.

3. The AC/DC converter device according to claim 1, wherein said current command value repeatedly takes a rising waveform rising in the region corresponding to said phase of 60 degrees, and a falling waveform falling in the region corresponding to said phase of 60 degrees, wherein, when it is supposed that the minimum value and the maximum value of said carrier are m and M, respectively, said rising waveform takes a value $((m+M)+\sqrt{3}\cdot(M-m)\cdot\tan(\phi-\pi/6))/2$ with respect to a phase angle $\phi$ having a point where said rising waveform starts to rise as a starting point, and said falling waveform takes a value $((m+M)-\sqrt{3}\cdot(M-m)\cdot\tan(\phi-\pi/6))/2$ with respect to a phase angle $\phi$ having a point where said falling waveform starts to fall as a starting point.

4. The AC/DC converter device according to claim 2, wherein said current command value repeatedly takes a rising waveform rising in the region corresponding to said phase of 60 degrees, and a falling waveform falling in the region corresponding to said phase of 60 degrees, wherein, when it is supposed that the minimum value and the maximum value of said carrier are m and M, respectively, said rising waveform takes a value $((m+M)+\sqrt{3}\cdot(M-m)\cdot\tan(\phi-\pi/6))/2$ with respect to a phase angle $\phi$ having a point where said rising waveform starts to rise as a starting point, and said falling waveform takes a value $((m+M)-\sqrt{3}\cdot(M-m)\cdot\tan(\phi-\pi/6))/2$ with respect to a phase angle $\phi$ having a point where said falling waveform starts to fall as a starting point.

* * * * *